US008448226B2

(12) United States Patent  (10) Patent No.: US 8,448,226 B2
Narasimhan  (45) Date of Patent: May 21, 2013

(54) COORDINATE BASED COMPUTER AUTHENTICATION SYSTEM AND METHODS

(76) Inventor: Sarangan Narasimhan, Mountain View, CA (US)

( * ) Notice: Subject to any disclaimer, the term of this patent is extended or adjusted under 35 U.S.C. 154(b) by 1194 days.

(21) Appl. No.: 11/912,537

(22) PCT Filed: May 11, 2006

(86) PCT No.: PCT/US2006/018536
§ 371 (c)(1),
(2), (4) Date: Oct. 25, 2007

(87) PCT Pub. No.: WO2006/124666
PCT Pub. Date: Nov. 23, 2006

(65) Prior Publication Data
US 2008/0184363 A1   Jul. 31, 2008

Related U.S. Application Data

(60) Provisional application No. 60/681,129, filed on May 13, 2005, provisional application No. 60/735,317, filed on Nov. 9, 2005.

(51) Int. Cl.
*H04L 29/06* (2006.01)
(52) U.S. Cl.
USPC ................ 726/5; 713/183; 713/184; 382/100
(58) Field of Classification Search
USPC ........................ 726/5; 713/183, 184; 382/100
See application file for complete search history.

(56) References Cited

U.S. PATENT DOCUMENTS

| 5,276,314 | A | * | 1/1994 | Martino et al. | 340/5.27 |
|---|---|---|---|---|---|
| 5,465,084 | A | * | 11/1995 | Cottrell | 340/5.27 |
| 5,559,961 | A | * | 9/1996 | Blonder | 726/18 |
| 5,664,099 | A | * | 9/1997 | Ozzie et al. | 726/29 |
| 5,815,083 | A | * | 9/1998 | Patarin et al. | 340/5.27 |
| 5,928,364 | A | * | 7/1999 | Yamamoto | 726/18 |
| 5,949,348 | A | * | 9/1999 | Kapp et al. | 340/5.4 |
| 6,101,482 | A | | 8/2000 | Diangelo et al. | |
| 6,226,412 | B1 | | 5/2001 | Schwab | |
| 6,609,658 | B1 | | 8/2003 | Sehr | |
| 6,718,471 | B1 | * | 4/2004 | Kashima | 726/9 |
| 6,720,860 | B1 | * | 4/2004 | Narayanaswami | 340/5.54 |
| 6,876,979 | B2 | | 4/2005 | Ling | |
| 6,968,449 | B1 | * | 11/2005 | Sierra et al. | 713/1 |
| 6,980,081 | B2 | * | 12/2005 | Anderson | 340/5.53 |
| 7,146,404 | B2 | * | 12/2006 | Kay et al. | 709/206 |
| 7,441,122 | B2 | * | 10/2008 | Plagne | 713/182 |
| 7,523,486 | B1 | * | 4/2009 | Turner | 726/2 |
| 7,577,987 | B2 | * | 8/2009 | Mizrah | 726/5 |
| 7,616,764 | B2 | * | 11/2009 | Varghese et al. | 380/255 |
| 7,734,929 | B2 | * | 6/2010 | Debrito | 713/184 |
| 7,822,990 | B2 | * | 10/2010 | Varghese et al. | 713/182 |
| 2001/0044906 | A1 | * | 11/2001 | Kanevsky et al. | 713/202 |
| 2002/0029341 | A1 | * | 3/2002 | Juels et al. | 713/184 |
| 2002/0188872 | A1 | * | 12/2002 | Willeby | 713/202 |
| 2003/0177366 | A1 | * | 9/2003 | de Jong | 713/184 |

(Continued)

*Primary Examiner* — Michael Pyzocha
(74) *Attorney, Agent, or Firm* — Shalini Venkatesh

(57) ABSTRACT

A coordinate-based computer authentication system (1) and methods have been disclosed. A method comprises providing instructions to present a graphical interface (1, 121) on a display, wherein the graphical interface includes a plurality of graphical images. Selection information is received that corresponds to the selection of one or more of the plurality of graphical images. The selection information is authenticated (1, 110).

9 Claims, 19 Drawing Sheets

1300

U.S. PATENT DOCUMENTS

| | | |
|---|---|---|
| 2003/0182558 A1* | 9/2003 | Lazzaro et al. .............. 713/183 |
| 2004/0010721 A1* | 1/2004 | Kirovski et al. ............. 713/202 |
| 2004/0030934 A1* | 2/2004 | Mizoguchi et al. ........... 713/202 |
| 2004/0054929 A1* | 3/2004 | Serpa ........................... 713/202 |
| 2004/0093527 A1* | 5/2004 | Pering et al. ................. 713/202 |
| 2004/0153660 A1* | 8/2004 | Gaither et al. ............... 713/200 |
| 2004/0243855 A1* | 12/2004 | Plagne ......................... 713/202 |
| 2005/0010768 A1* | 1/2005 | Light et al. .................. 713/168 |
| 2005/0010785 A1* | 1/2005 | Abe et al. .................... 713/182 |
| 2005/0038675 A1* | 2/2005 | Siekman et al. .............. 705/2 |
| 2005/0204041 A1* | 9/2005 | Blinn et al. .................. 709/225 |
| 2005/0251752 A1* | 11/2005 | Tan et al. ..................... 715/741 |
| 2005/0275661 A1* | 12/2005 | Cihula et al. ................ 345/619 |
| 2006/0005039 A1* | 1/2006 | Hsieh ........................... 713/183 |
| 2006/0021004 A1* | 1/2006 | Moran et al. ................. 726/2 |
| 2007/0277224 A1* | 11/2007 | Osborn et al. ................ 726/2 |

* cited by examiner

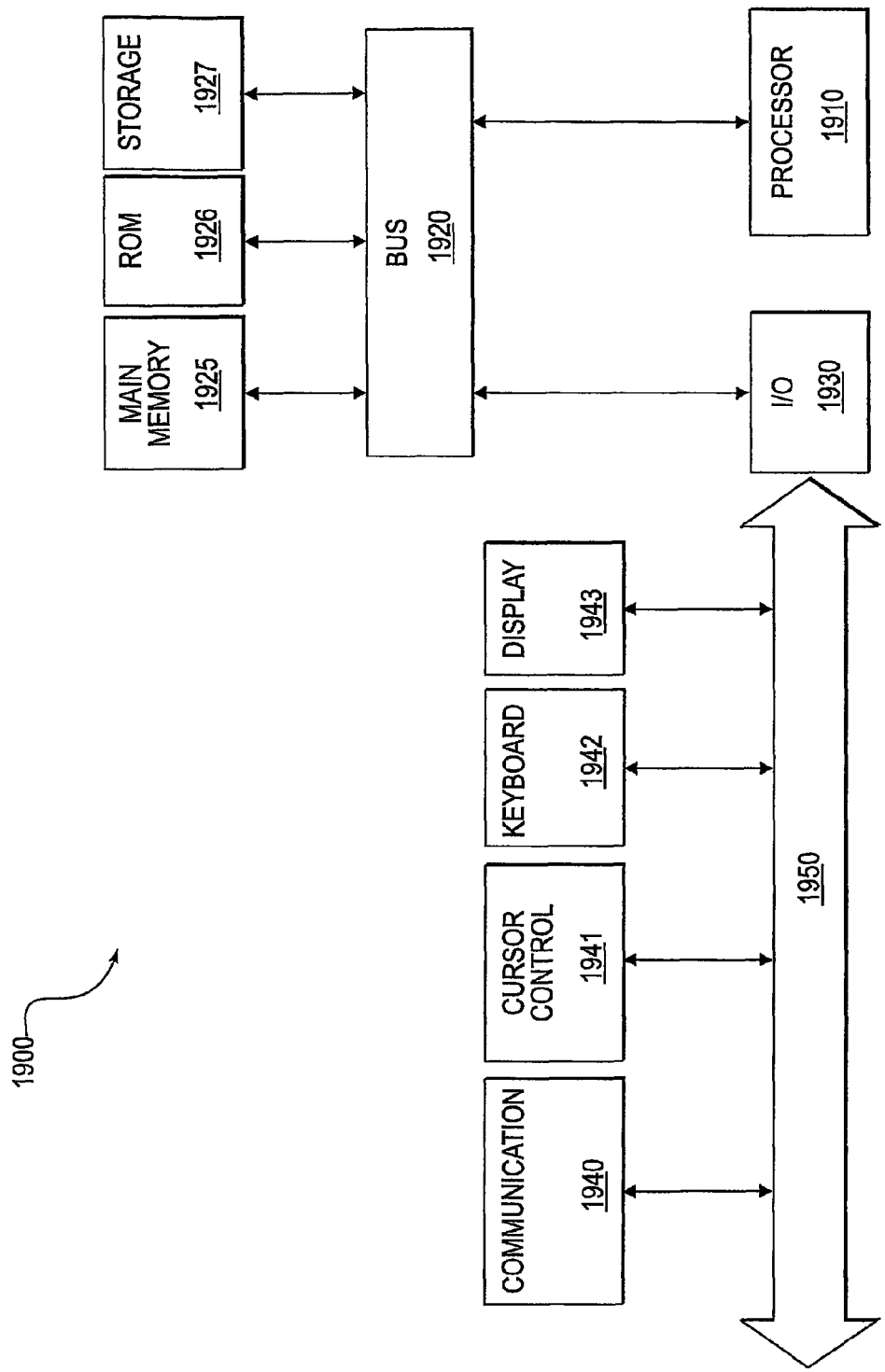

COORDINATE BASED COMPUTER AUTHENTICATION SYSTEM AND METHODS

This application claims priority to U.S. Provisional Patent Application Ser. No. 60/681,129, filed on May 13, 2005, and U.S. Provisional Patent Application Ser. No. 60/735,317, filed on Nov. 9, 2005, which are hereby incorporated by reference as if set forth in full in this application for all purposes.

TECHNICAL FIELD

The present invention relates generally to computer security and, in particular, a coordinate-based computer authentication system and methods.

BACKGROUND

There is a growing problem of spyware, adware and other types of parasitic programs that surreptitiously or otherwise install themselves on computers and record everything on the host computer from files stored, websites visited to keystrokes logged. Spyware, generically, may be running on the user's own computer, a networked system, or a shared computer with the consequence that, at any point, any entered information could be compromised. Conventionally, a connection with a remote, otherwise secure website is considered secure if the communications channel is encrypted. Spyware, however, can operate to intercept or otherwise compromise the local keyboard login actions prior to encryption. Unencrypted connections are equally vulnerable.

Keyboard entered data can be captured and compromise the security of the local client, the local user, and the remote website. Keystroke logging is particularly troublesome as it increases the risk of disclosure of confidential or secure information such as login names and passwords. Spyware may discreetly transmit stolen login and password information via the Internet to malicious persons and users, who may use the information to gain access to personal information or access to server accounts. A malicious user using a keystroke logger may obtain log in information to gain access to email accounts, break into online banking and brokerage accounts, and perpetrate identity theft.

Anti-spyware programs attempt to minimize this problem by detecting and uninstalling parasitic spyware. Inherently, anti-spyware programs cannot successfully detect and remove every kind of spyware running on a computer. Anti-spyware programs can only identify and remove programs that match spyware that has already been identified. In addition, anti-spyware software requires diligent use and regular updates. There is also the added problem that when accessing online services from public computers, there is no reliable guarantee that the computer is free of spyware or that current anti-spyware programs are installed and used on the public computer.

A related problem exists for users who require a secure way to easily transmit confidential information, such as a credit card number or pin number, to each other. Transmitting confidential information via email normally requires that the individuals use public key encryption, which can be quite complex to establish, or simply leave the codes in plain text, subject to the risk that the email will be intercepted or otherwise compromised. Plain text transmission of confidential information risks interception or being otherwise compromised by a third party. Plain text transmission of confidential information also risks later compromise of a stored copy of the plain text email. Remote or Web-based email systems, such as Yahoo and Hotmail, archive email messages for extended periods, if not indefinitely. Other email systems, such as GMail, scan the contents of email, potentially compromising the plain text contents of the email. Consequently, if either the sender or recipient is using these types of services, there is a heightened risk of compromise of sensitive information transmitted in these emails.

SUMMARY

A coordinate-based computer authentication system and methods have been disclosed. A method comprises providing instructions to present a graphical interface on a display, wherein the graphical interface includes a plurality of graphical images. Selection information is received that corresponds to the selection of one or more of the plurality of graphical images. The selection information is authenticated.

BRIEF DESCRIPTION OF THE DRAWINGS

The invention will be better understood from a reading of the following detailed description in conjunction with the drawing figures, in which like reference designators are used to identify like elements and in which:

FIG. 19 illustrates an exemplary computer architecture for use with the present system, according to one embodiment of the invention.

DETAILED DESCRIPTION

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
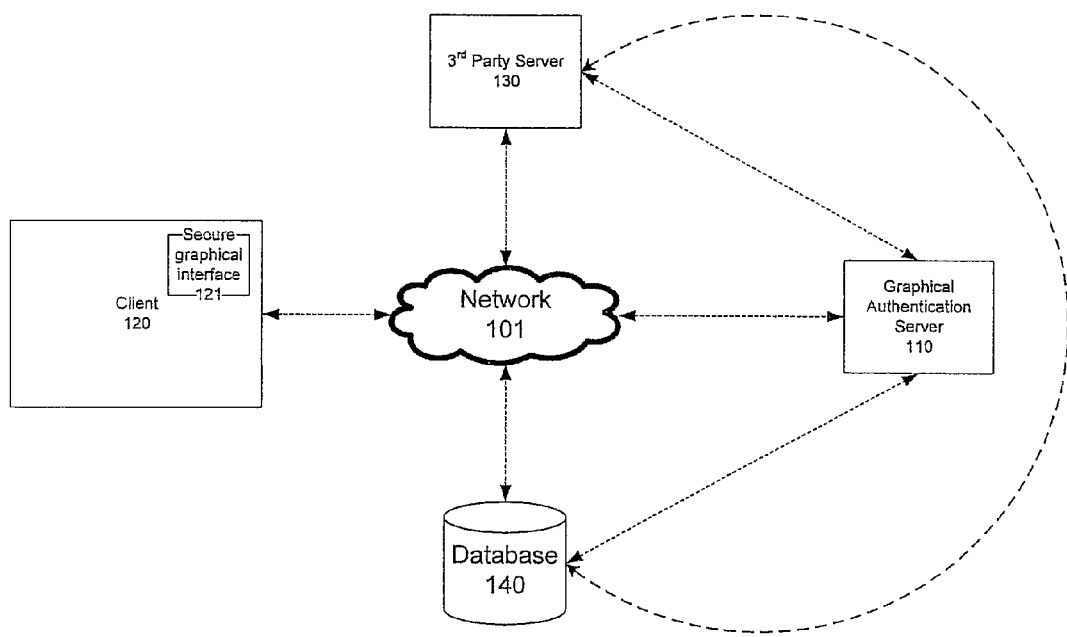
FIG. 1 is a block diagram of an exemplary system architecture, according to one embodiment of the present invention.

FIG. 1 is a block diagram of an exemplary system architecture, according to one embodiment of the present invention. The graphical authentication server 110 is a computer system that contains software that generates a secure graphical authentication interface 121 for presentation on a client 120. A graphical authentication server 110 could be built using a combination of technologies such as those from Apache Software (www.apache.org) such as Tomcat servers; Java based technologies such as J2EE, EJB, JBOSS, JDBC; and/or databases such as MySQL. A graphical authentication server 110 may also include other supporting computing software and hardware, for example, databases, computers, and user interface servers. In another embodiment, the graphical authentication server 110 is built using software located on the same computer system as client 120, such as software installed on client 120.

The client 120 communicates with the graphical authentication server 110 and a third party server 130 using a communications network 101. The client 120 may use the secure graphical interface to log in to the graphical authentication server 110 a third party server 130, or a database 140. Using the secure graphical interface 121, client 120 transmits information to a graphical authentication server 110. A graphical authentication server 110, a third party server 130, and a database 140 may use the same or another communications network to communicate with each other. In another embodiment, the graphical authentication server 110, a third party server 130, and a database 140 may use a non-network communications link to communicate to each other, including shared memory. In another embodiment, the graphical authentication server 110, a third party server 130, and a database 140 may use a secure communications link to communicate to each other, such as a link using SSL.

The term "log in" includes the authentication of a client 120, using authentication information such as a name, password, or other private or personal information, such as a unique code or secret phrase. Authentication information need not have to be static, and may change based on other factors. An example is a secret phrase based on how many days have elapsed since a particular date. The term "log in" includes providing a combination of pieces of information, such as authentication based on name, password, and unique phrase.

The term "log in" does not require that a client 120 be uniquely identified, but pertains to the verification or secure transmission of any type of information regarding a client 120 or a user interacting with client 120. For example, authentication may verify that a client 120 is in possession of some unique information that allows specific privileges. Secure transmission includes the transmission of information through the secure graphical interface 121 to lower the risk of the compromise of the information.

The term "third party server" 130 includes any computer system that provides information to a client 120. The third party server 130 uses any one of a number of well-known protocols and/or applications including HyperText Transfer Protocol (HTTP), File Transfer Protocol (FTP), Internet Relay Chat (IRC), Secure Socket Layers (SSL), etc., via a TCP/IP connection (not shown in this view) or some other connection well known in the art. The operating system may be Windows®, LINUX, SUN Solaris®, Mac OS or other similar operating system. A third party server 130 could be built using a combination of technologies such as those from Apache Software (www.apache.org) such as Tomcat servers; Java based technologies such as J2EE, EJB, JBOSS, JDBC; and/or databases such as MySQL.

The term "client" 120 includes any electronic system that can provide an interface for interaction with users, servers and other network components. The term includes computers, portable communications devices, and consumer electronics equipment. In an embodiment, the client 120 is an automated teller machine. Additionally, client 120 may be a mobile device, such as a videophone, laptop, smart phone, mobile phone, PDA, game device such as the PSP manufactured by Sony Electronics, multimedia device such as the iPod manufactured by Apple Computers of Cupertino, Calif., or Origami devices marketed by Microsoft Corp. of Redmond, Wash., or similar device. Client 120, could be a fixed device such as a set top box, desk top computer, a media recorder such as those manufactured by TiVo, Inc. of Alviso, Calif., a game device such as the XBox manufactured by Microsoft Corp. of Redmond, Wash. or similar devices.

The term "database" 140 refers to any computer system with software that performs information storage, and is not limited to those based on relational database technologies such as SQL.

The term "network" 101 includes communications networks, including those based on TCP/IP protocols, Wide Area Networks (WAN), Local Area Networks (LAN), mobile wireless networks, and any other system of interconnection enabling two or more devices to exchange information.

Figure 2:
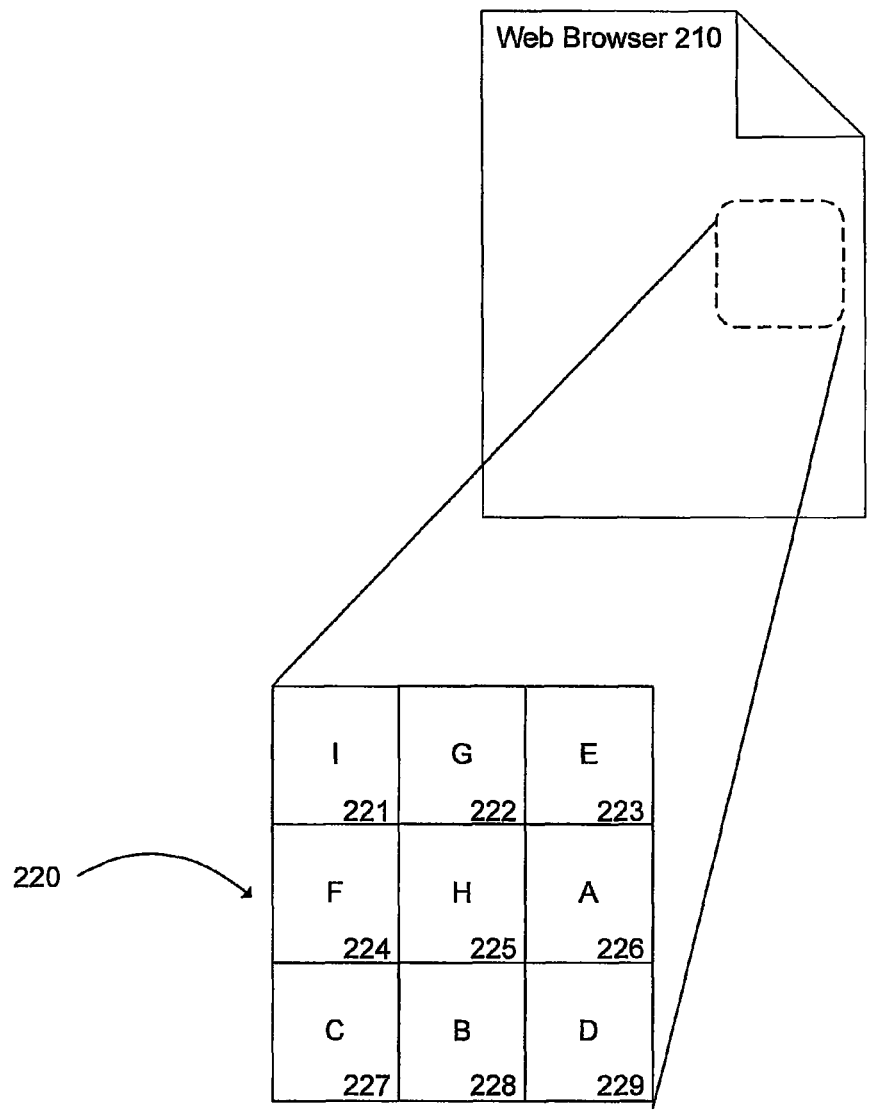
FIG. 2 illustrates a block diagram of an exemplary secure graphical interface, according to one embodiment of the present invention.

FIG. 2 illustrates a block diagram of an exemplary secure graphical interface, according to one embodiment of the present invention. A client 120 presents a web browser 210 to a user interacting with the client 120. The web browser 210 contains a reference to a secure graphical interface 220. This secure graphical interface 220 is displayed by the web browser 210. In another embodiment, the secure graphical interface 220 is a "pop-up" window requested by the web browser 210. The term "pop-up" includes any presentation independent of a web browser 210, such as by another web browser or another application software. The web browser 210 may request the presentation of the "pop-up" using any method, including a scripting language such as JavaScript. In another embodiment, the secure graphical interface 220 is presented to a user interacting with client 120 via a toolbar in a web browser 210 or other software operating on a client 120.

The secure graphical interface 220 may present any number of graphical representations 221-229 for selection. In one embodiment of the present invention, the graphical representations 221-229 illustrate alphanumeric characters. In another embodiment, the graphical representations 221-229 illustrate images. In another embodiment, the graphical representations 221-229 illustrates a combination of alphanumeric characters and graphical images.

The secure graphical interface 220 accepts coordinate-based inputs that map to each graphical representations 221-229 presented. A "coordinate-based input" may refer to any input used to select coordinates corresponding to a particular graphical representation. In an embodiment, the coordinate-based input includes a position of a user selection icon, such as a pointer linked to the movement of a mouse (or any other icon linked to a user input device). In another embodiment, the coordinate-based input is input received from a keyboard in which its keys are mapped to a particular coordinate position. In another embodiment, the coordinate-based input is received from a keyboard in which its keys are mapped to a particular character.

Using secure graphical interface 220, client 120 transmits selection information to a graphical authentication server 110. In one embodiment, the selection information includes data indicating the coordinate-based input. In another embodiment, selection information includes data indicating the relative movement of the position of a user selection icon. For example, selection information may include distance and direction of the movement of a user selection icon. In another embodiment, the selection information includes data identifying which graphical representation 221-229 was selected by the user based on the coordinate-based input. In yet another embodiment, the selection information includes information corresponding to a plurality of coordinate-based inputs to a graphical authentication server 110.

In another embodiment, the selection information includes a combination of information related to the coordinate-based information and information unrelated to the coordinate-based input. Information unrelated to the coordinate-based input may include information intended to mislead or otherwise frustrate and confuse a hacker attempting to intercept or otherwise compromise the secure transmission of information between client 120 and the graphical authentication server 110.

In one embodiment, the graphical authentication server 110 or secure graphical interface 121 transmits false graphical representations 221-229 and/or selection information to frustrate any attempt to intercept or otherwise compromise the transmission of information between a graphical authentication server 110 and a client 120 presenting a secure graphical interface 121. In one embodiment, using the secure graphical interface 121, a client 120 transmits incorrect or false selection information over a network 101 that risks interception, or being compromised. This incorrect or false selection data is information that does not correspond to the client selection information or client coordinate-based input. For example, a secure graphical interface 121 presented by client 120 receives coordinate-based input corresponding to the selection of "1234." The client 120, using secure graphical interface 121, transmits false data to the graphical authentication server 110 that corresponds to the selection of "4567." In this example, a hacker or other malicious client is unable to distinguish from a client transmitting true selection data from a client transmitting incorrect or false selection data, frustrating attempts to compromise a graphical authentication server 110 or the true selection information transmitted by the client.

In another embodiment, the graphical authentication server 110 generates a false secure graphical interface 121 that does not correspond to a client log in request. For example, a graphical authentication server 110 transmits instructions for the presentation of a false secure graphical interface 121 over a network 101 subject to interception or being otherwise compromised. The graphical authentication server 110 can reject any log in attempt based on this false secure graphical interface 121, because any such log in attempt using this false secure graphical interface 121 is a fraudulent log in attempt. A hacker or other malicious user is unable to use the "false" secure graphical interface 121 to log in to the graphical authentication server 110. A false secure graphical interface 121 allows a client to indicate that the false secure graphical interface 121 does not permit entry of the true selection information. At that point, another secure graphical interface 121 is generated that may be true or false.

Figure 3:
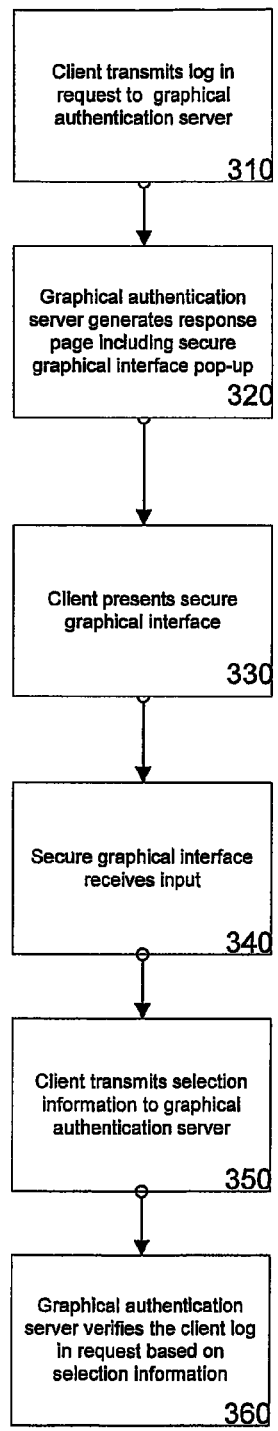
FIG. 3 is a flowchart illustrating an exemplary authentication process using a secure graphical interface, according to one embodiment of the present invention.

FIG. 3 is a flowchart illustrating an exemplary authentication process using a secure graphical interface, according to one embodiment of the present invention. A client 120 sends a request to log in to a graphical authentication server 110 (310). The graphical authentication server 110 generates a secure graphical interface 121, and sends a response to the client 120 that includes instructions for the presentation of a secure graphical interface 121 generated by the graphical authentication server 110 (320).

The client 120 presents the secure graphical interface 121 to a user interacting with client 120 (330). The secure graphical interface 121 receives coordinate-based input (340). Using secure graphical interface 121, client 120 transmits to a graphical authentication server 110 the selection information (350). In another embodiment, the client 120 uses secure graphical interface 121 to transmit selection information to a server other than the server that generated the secure graphical interface 120.

The graphical authentication server 110 verifies the client log in request based on the selection information (360). In one embodiment, the term "verifies" refers to the graphical authentication server 110 using the selection information to authenticate the client log in request.

Figure 4:
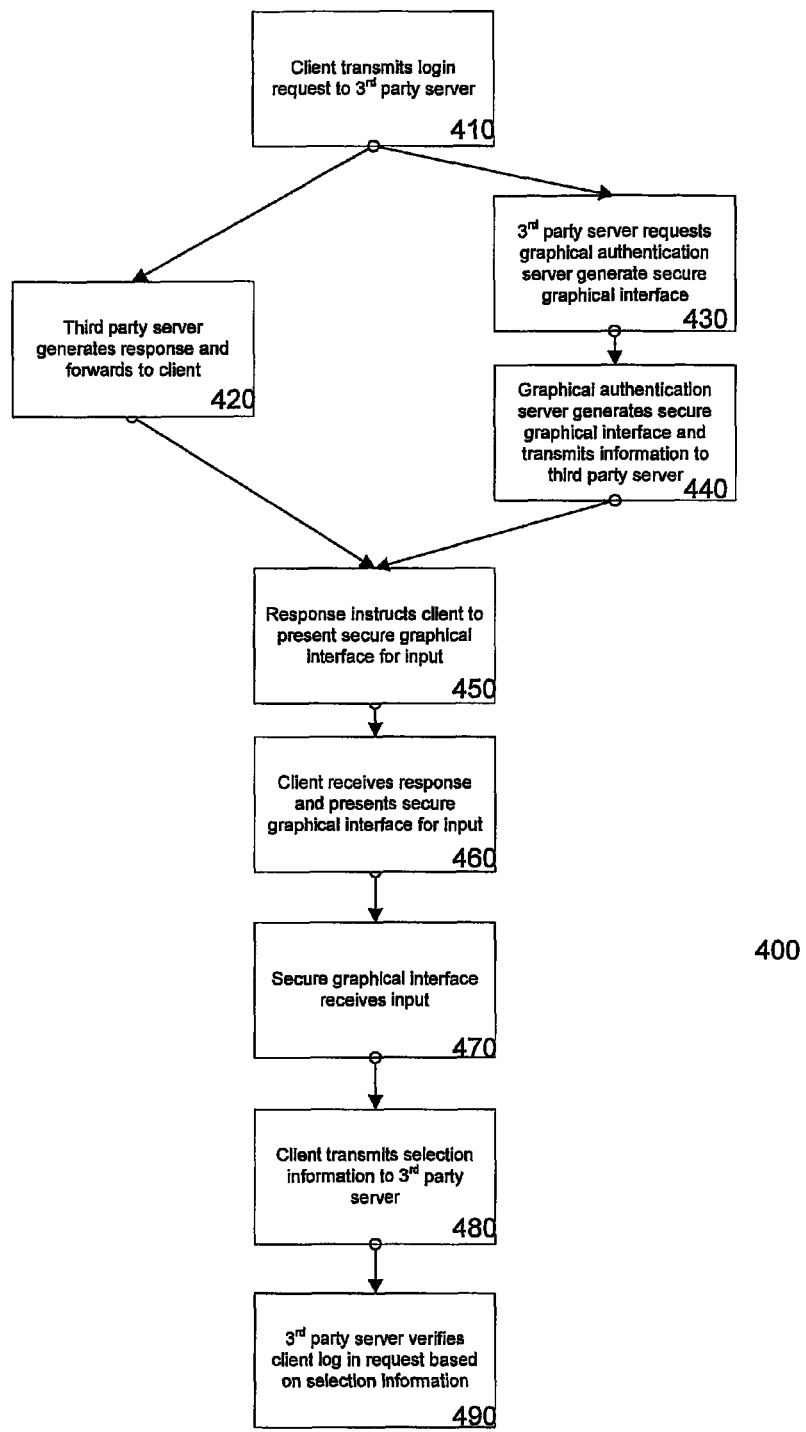
FIG. 4 is a flowchart illustrating an exemplary authentication process using a third party server according to one embodiment of the present invention.

FIG. 4 is a flowchart illustrating an exemplary authentication process using a third party server according to one embodiment of the present invention. Process 400 allows a graphical authentication server 110 to generate a secure graphical interface 121 on behalf of a third party server 130, while allowing the third party server 130 to verify the log in request. This embodiment reduces computation loads on a third party server 130 without forcing a third party server 130 to share potentially confidential data used to verify client log in requests.

A client 120 sends a log in request to a third party server 130 (410). The third party server 130 generates a response and transmits the response to the client 120 (420). In another embodiment, this response is an acknowledgement of the client's log in request. In another embodiment, the graphical authentication server 110 generates the response and transmits the response to the client 120. The third party server 130 also requests that a graphical authentication server 110 generate a secure graphical interface (430). The graphical authentication server 110 generates instructions for the presentation of a secure graphical interface 121 and transmits the presentation instructions to the third party server 130 (440). The graphical authentication server 110 also transmits unmapping instructions to the third party server 130 (440). Unmapping instructions is information that associates selection information generated by the secure graphical interface 121 with the graphical representation selected by the user interacting with client 120. The response generated by the third party server 130 contains instructions for the client 120 to present the secure graphical interface 121 (450). The client 120 receives the response and presents the secure graphical interface 121 to a user interacting with a client 120 (460).

The secure graphical interface 121 receives coordinate-based input from a user (470). Using the secure graphical interface 121, client 120 transmits selection information to the third party server 130 (480). The third party server 130 verifies the client log in request based on the selection information (490).

Figure 5:
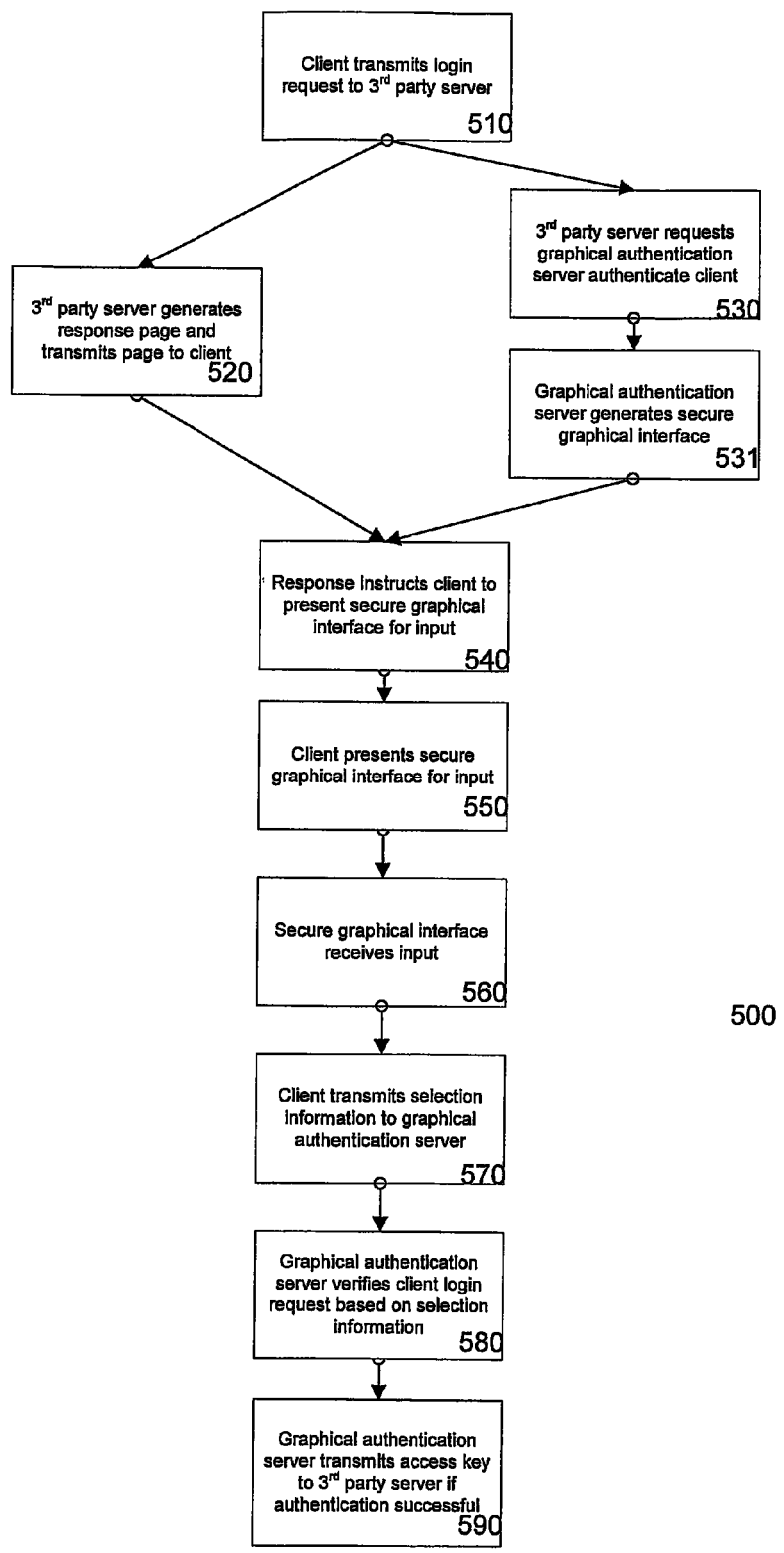
FIG. 5 is a flowchart illustrating an exemplary authentication process using a graphical authentication server and a secure graphical interface, according to one embodiment of the present invention.

FIG. 5 is a flowchart illustrating an exemplary authentication process using a graphical authentication server and a secure graphical interface, according to one embodiment of the present invention. Process 500 uses a graphical authentication server 110 to generate a secure graphical interface 121 and to verify a client log in request to a third party server 130.

A client 120 sends a log in request to a third party server 130 (510). The third party server 130 generates a response and transmits the response to the client 120 (520). In an embodiment, the response includes an acknowledgement of the client's log in request. The third party server 130 also requests that a graphical authentication server 110 generate a secure graphical interface 121 (530). The graphical authentication server 110 generates instructions for the presentation of a secure graphical interface 121 (531). The response generated by the third party server 130 instructs the client 120 to present the secure graphical interface 121 (540). The client 120 receives the response and presents the secure graphical interface 121 to a user interacting with the client 120 (550).

The secure graphical interface 121 receives coordinate-based input (560). Using the secure graphical interface 121, client 120 transmits selection information to the graphical authentication server 110 (570).

The graphical authentication server 110 verifies the client log in request based on the selection information received (580). If the graphical authentication server 110 successfully verifies the client log in request, it forwards an access key to the third party server 130 (590). Access keys include any information that indicates that the client log in request was successfully verified. In an embodiment, the access keys are unique to each client 120. In yet another embodiment, the access keys change based upon a pre-determined change sequence. In yet another embodiment, a particular access key may only be used once.

Figure 6:
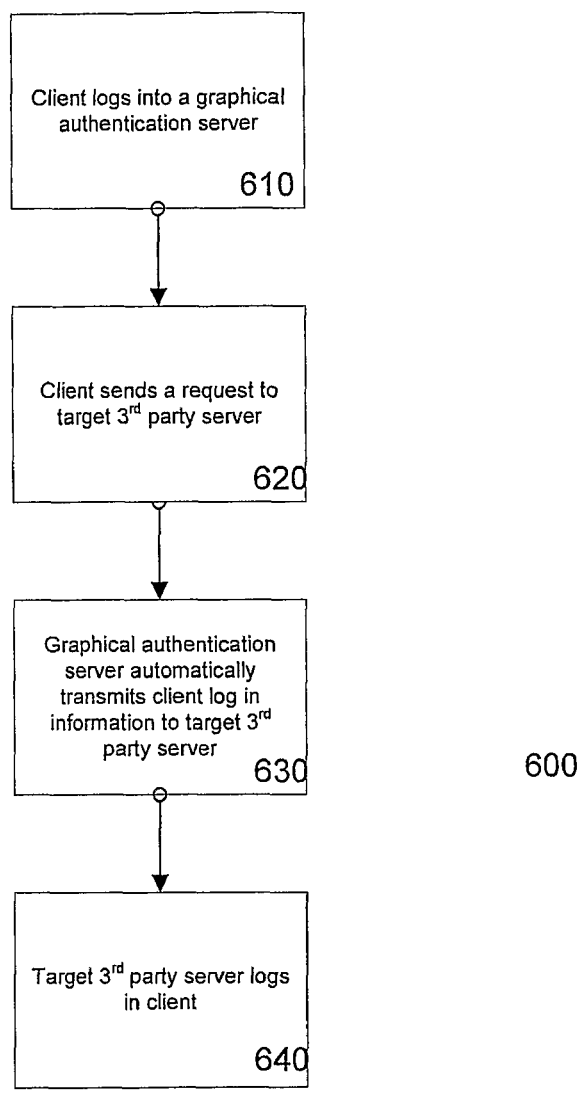
FIG. 6 is a flowchart illustrating an exemplary authentication process using a graphical authentication server that stores a client's log in information, according to one embodiment of the present invention.

FIG. 6 is a flowchart illustrating an exemplary authentication process using a graphical authentication server that stores a client's log in information, according to one embodiment of the present invention. In one embodiment, a graphical authentication server 110 stores client log in information and uses that stored information to automatically log in a client to third party web servers as the client sends requests to various third party web servers, including log in requests. This invention is not limited to web server third party servers. According to one embodiment, a graphical authentication server 110 stores client log in information for a third party server 130. In another embodiment, a graphical authentication server is coupled with a database 140 storing client log in information.

A client 120 logs into a graphical authentication server 110 (610). In one embodiment, a client 120 uses a secure graphical interface 121 to log into the secure graphical server 110.

A logged in client 120 transmits to a third party server 130 a request to log in (620). In one embodiment, the third party server 130 transmits the log in request to the graphical authentication server 110. In another embodiment, the client 120 transmits the log in request to the graphical authentication server 110. The graphical authentication server 110 transmits to the third party server 130 information corresponding to the client's log in information for the third party server 130 (630).

The target third party server 130 logs in the client 120 based on the client log in information received from the graphical authentication server 110 (640).

Figure 7:
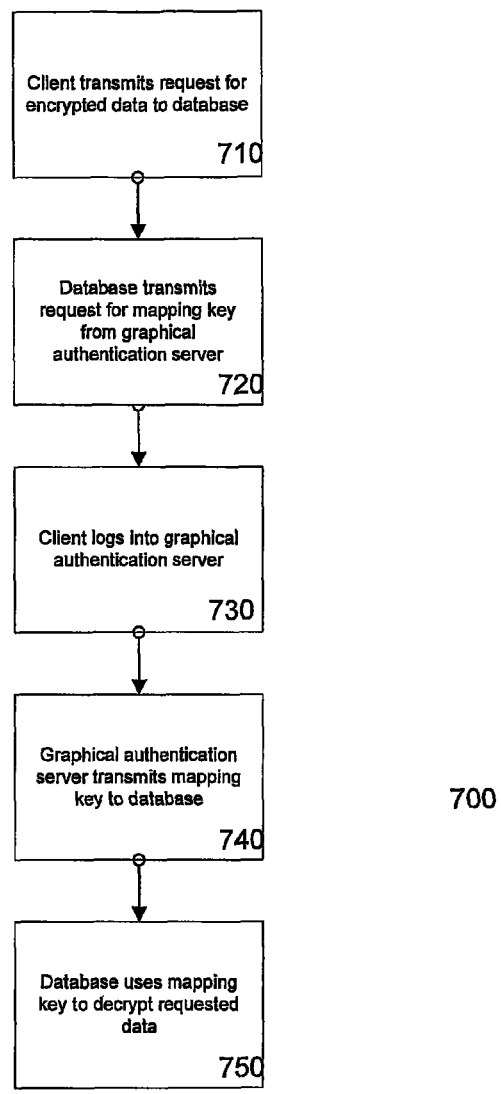
FIG. 7 is a flowchart illustrating an exemplary database decryption process using a graphical authentication server, according to one embodiment of the present invention.

FIG. 7 is a flowchart illustrating an exemplary database decryption process using a graphical authentication server, according to one embodiment of the present invention. According to one embodiment, information is stored on a database 140 as encrypted data, and not unencrypted data highly vulnerable to compromise. For example, database 140 operated by a hospital stores an encrypted version of a patient's credit card number used for payment. To access an unencrypted version of the patient's credit card number, a client 120 must use a secure graphical interface 121 to log into a graphical authentication server 110 to see an unencrypted copy of the patient's credit card number. In this example, if the security database 140 is compromised or stolen, the stored patient's credit card number information still is protected by encryption.

In one embodiment, a database 140 stores encrypted information that requires a mapping key to decrypt the encrypted information. Mapping keys include information that can be used to convert encrypted data into unencrypted data using an encryption algorithm such as RSA. A client 120 requesting the encrypted information uses a secure graphical interface 121 to access a mapping key stored in a graphical authentication server 110. The database 140 uses the mapping key to decrypted the requested data. In another embodiment, the client 120 uses the mapping key to decrypt the requested data.

A client 120 sends a request for data stored in a database 140 (710). The database 140 transmits a request for a mapping key for the requested data from a graphical authentication server 110 that stores a mapping key (720). The user logs into the graphical authentication server as in FIG. 2 (730). The graphical authentication server 110 transmits a mapping key to the database 140 (740).

The database 140 uses a mapping key to decrypt the data requested by the client (750). In another embodiment of the present invention, the database 140 uses a mapping key to encrypt the requested information. For example, a client 120 seeking to encrypt information stored inside a database 140 logs into a graphical authentication server 110 to access a mapping key, and the database 140 uses the mapping key to encrypt data.

Figure 8:
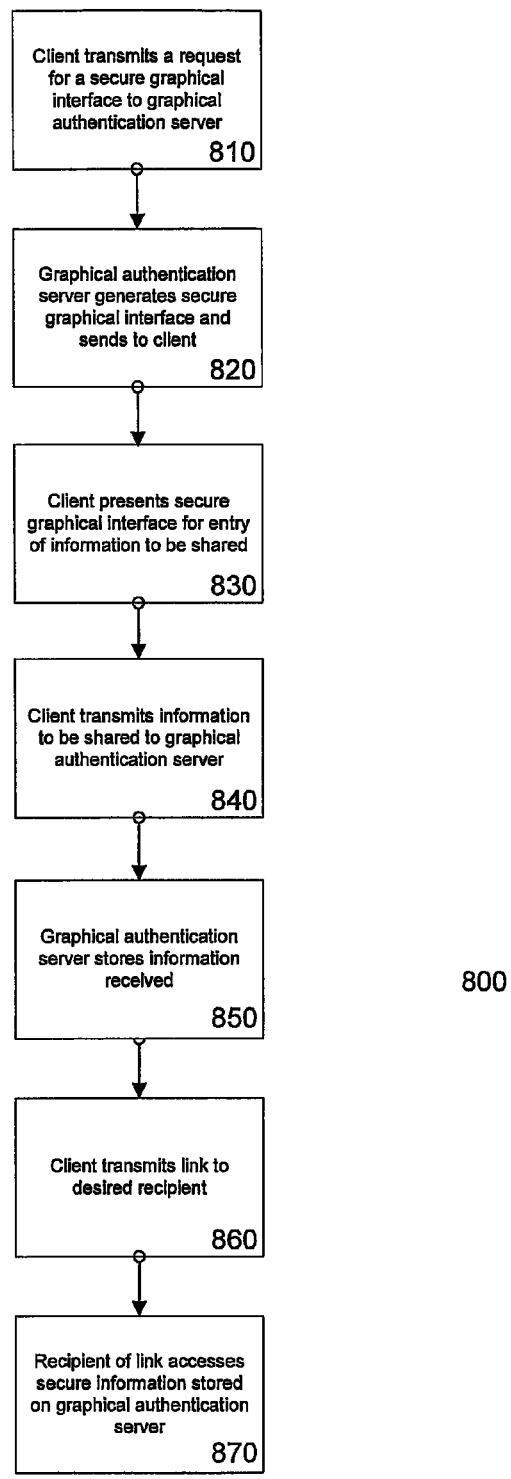
FIG. 8 is a flowchart illustrating an exemplary secure data transmission process using a secure graphical interface, according to one embodiment of the present invention.

FIG. 8 is a flowchart illustrating an exemplary secure data transmission process using a secure graphical interface, according to one embodiment of the present invention. For example, a client 120 uses a secure graphical interface 121 to enter the text of a secure email to be stored as an image file by a secure email server. The secure email server forwards to the client 120 a unique hypertext link referring to the image file. The client 120 then forwards the unique hypertext link to a recipient who uses the link to access the secure message. Using the unique hypertext link, the recipient can use a web browser to download a copy of the image file showing the text of the secure email message. In this example, only a graphical representation, and not the text of the secure email, is transmitted over a network.

In this embodiment, a secure graphical interface 121 is presented to a user interacting with a client 120. The secure graphical interface 121 receives coordinate-based input corresponding to information to send securely, including text of an email or instant message. The client 120 transmits a request for a secure graphical interface 121 to a graphical authentication server 110 (810). The graphical authentication server 110 generates a secure graphical interface and transmits to the client 120 instructions for the presentation of the secure graphical interface 121 (820). The client 120 presents a secure graphical interface to a user interacting with the client 120 to receive coordinate-based input (830). Using the secure graphical interface 121, a client 120 transmits selection information to the graphical authentication server 110 (840).

The graphical authentication server 110 receives selection information and transmits to a client 120 a link to the secure version of the information received (850). In an embodiment, the graphical authentication server 110 transmits the link as the body of an electronic mail message.

The client 120 transmits the link sent by the graphical authentication server 110 to the desired recipient (860). In another embodiment, the graphical authentication server 110 transmits the link to the desired recipient of the stored information.

The recipient accesses the secure message stored on the graphical authentication server 110 using the link transmitted by the client 120 (870).

Figure 9:
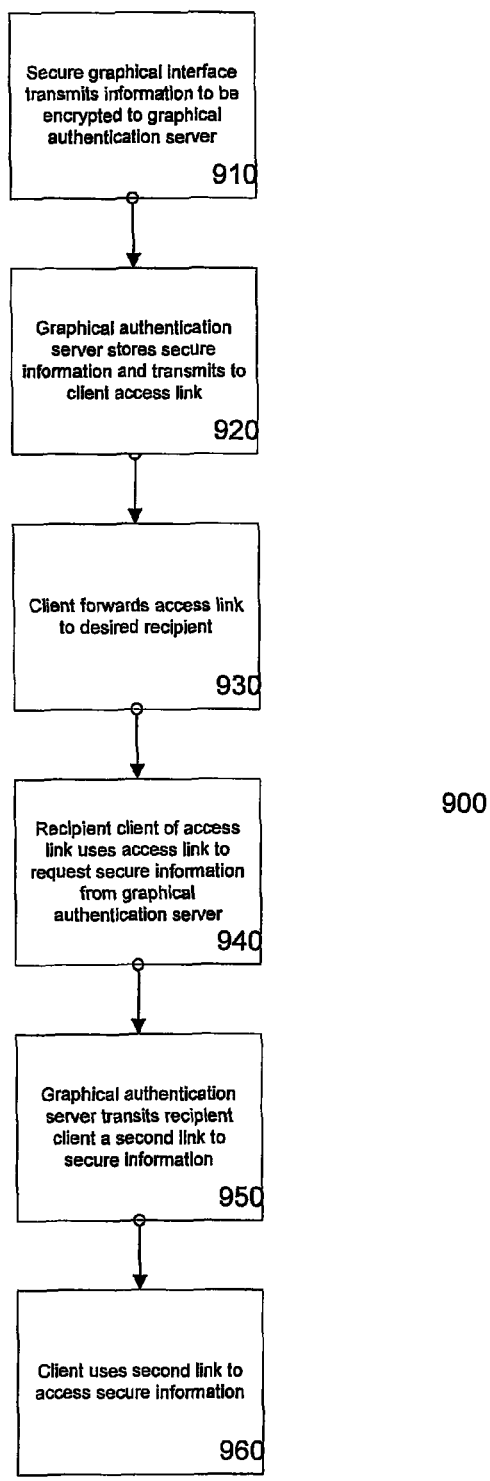
FIG. 9 is a flowchart illustrating another exemplary secure data transmission process using a secure graphical interface, according to one embodiment of the present invention.

FIG. 9 is a flowchart illustrating another exemplary secure data transmission process using a secure graphical interface, according to one embodiment of the present invention. For example, using a secure graphical interface 121, a user enters the text of a secure email message to be stored by a secure email server. The secure email server generates a unique hypertext link and returns the link to the client 120. The unique hypertext link requests access to the secure email message, stored as an image file. The client 120 forwards the link to the desired recipient of the secure email. Using the unique hyperlink, the desired recipient opens a web page to request access to the secure email message from the secure email server. The secure email server verifies that the recipient has not already read the message. Using a web browser, the recipient downloads a copy of the image file showing the text of the secure email message.

The client 120 transmits a request for a secure graphical interface 121 to a graphical authentication server 110 (810). The graphical authentication server 110 generates a secure graphical interface 121 and sends it to the requesting client 120 (820). The client 120 presents a secure graphical interface 121 to a user interacting with the client 120 and receives a coordinate-based input (830). Using the secure graphical interface 121, client 120 transmits selection information to the graphical authentication server 110 (910).

The graphical authentication server 110 receives selection information and transmits to the client 120 a first link to the secure version of the information received (920). In another embodiment, the graphical authentication server 110 transmits the first link in the body of an electronic mail message.

The client 120 transmits a first link to the desired recipient (930). In another embodiment, the graphical authentication server 110 transmits the link to the desired recipient of the stored information.

The recipient uses the first link to request the secure information from the graphical authentication server 110 (940). The graphical authentication server 110 transmits a second link to the recipient (950). The recipient uses the second link to access the secure information stored on the graphical authentication server 110 (960).

Figure 10:
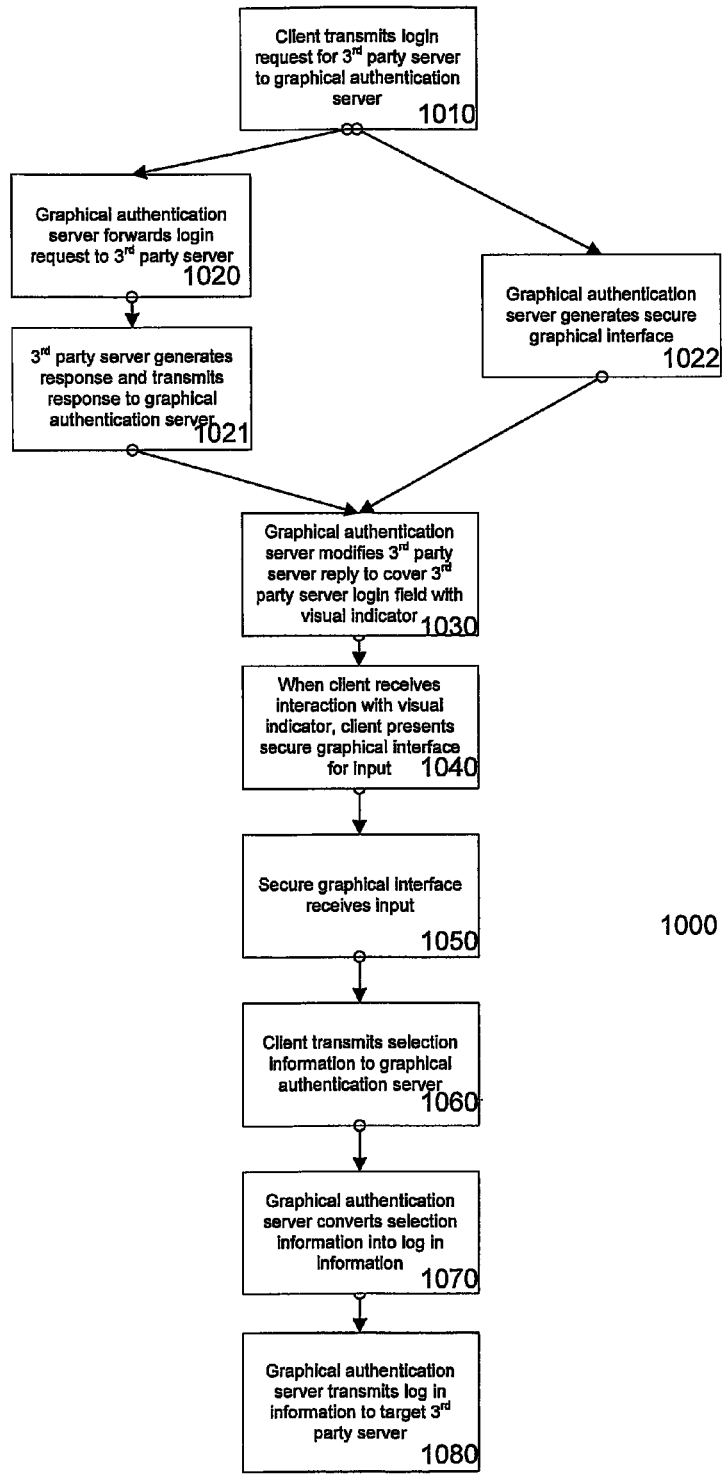
FIG. 10 is a flowchart illustrating an exemplary authentication process using a proxy graphical authentication server, according to one embodiment of the present invention.

FIG. 10 is a flowchart illustrating an exemplary authentication process using a proxy graphical authentication server, according to one embodiment of the present invention. For example, a bank web server uses a graphical authentication server 110 to log in users, but does not operate the graphical authentication server 110. The bank's customers interact with the secure graphical interface 121 generated by the graphical authentication server 110. The graphical authentication server 110 receives selection data from clients used by the bank's customers. In this embodiment, the graphical authentication server 110 handles the generation of the secure graphical interface 121 and conversion of selection information into log in information, without having to store personal information corresponding to the client's log in information. In this embodiment, a third party server 130 adds the functionality of the secure graphical interface 121 without having to operate a graphical authentication server 110.

Client 120 transmits to a graphical authentication server 110 a request to log in to a third party server 130 (1010). In another embodiment, client 120 uses a hyperlink or other reference, provided by the third party server 130, to transmit a request to the graphical authentication server 110. The graphical authentication server 110 transmits the request to the third party server 130 (1020). The third party server 130 generates a response and transmits the response to the graphical authentication server 110 (1021). In another embodiment, the response of the third party server 130 is already generated and stored on the graphical authentication server 110, and the graphical authentication server does not transmit the request to the third party server 130. The graphical authentication server 110 generates a secure graphical interface 121 for presentation by the client 120 (1022).

The graphical authentication server 110 modifies the third party server response to present a visual indicator (1030). In one embodiment, the visual indicator is presented to visually cover or appear in proximity to the third party server login request fields in the response. The client 120 presents the third party server response, as modified by the graphical authentication server 110, to a user interacting with the client 120. If the client 120 receives interaction with said visual indicator, the client 120 presents a secure graphical interface 121 to a user interacting with client 120 (1040). Such interaction includes a mouse button click, keyboard input or other input. In another embodiment, the visual indicator is the presentation of the secure graphical interface 121 to a user interacting with the client 120 (1040).

The secure graphical interface 121 receives coordinate-based input corresponding to the client log in information on the third party server 130 (1050). Using the secure graphical interface 121, client 120 transmits selection information to the graphical authentication server 110 (1060). The graphical authentication server 110 converts selection information into log in information (1070). The graphical authentication server 110 transmits the log in information to the third party server 130 (1080).

Figure 11:
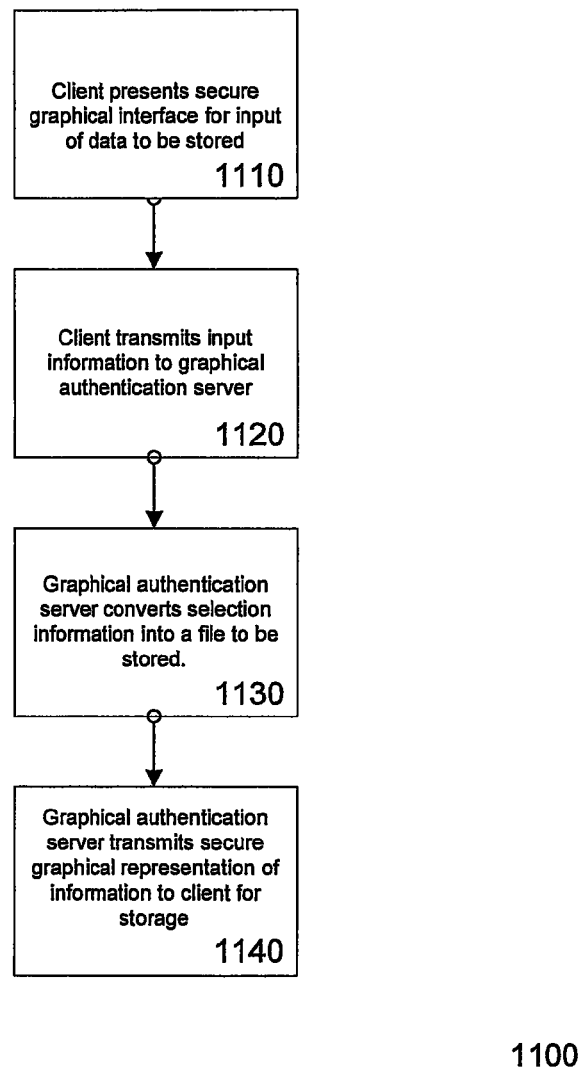
FIG. 11 is a flowchart illustrating an exemplary secure storage process using a secure graphical interface, according to one embodiment of the present invention.

FIG. 11 is a flowchart illustrating an exemplary secure storage process using a secure graphical interface, according to one embodiment of the present invention. For example, a user enters confidential financial information to be stored in a spreadsheet file using a secure graphical interface 121, to reduce the risk of compromise due to the threat of spyware on the client.

The client 120 presents a secure graphical interface 121 to a user interacting with client 120 to receive coordinate-based input corresponding to the data to be stored (1110). Using secure graphical interface 121, client 120 transmits selection information to the graphical authentication server 110 (1120). The graphical authentication server 110 converts the selection information to graphical information stored in a file (1130).

In one embodiment, the client 120 stores the selection information as a graphical file format, e.g., TIF, JPG, GIF, PDF (1140). In another embodiment of the present invention, the graphical authentication server 110 stores the selection information and transmits a link to the stored selection information.

Figure 12:
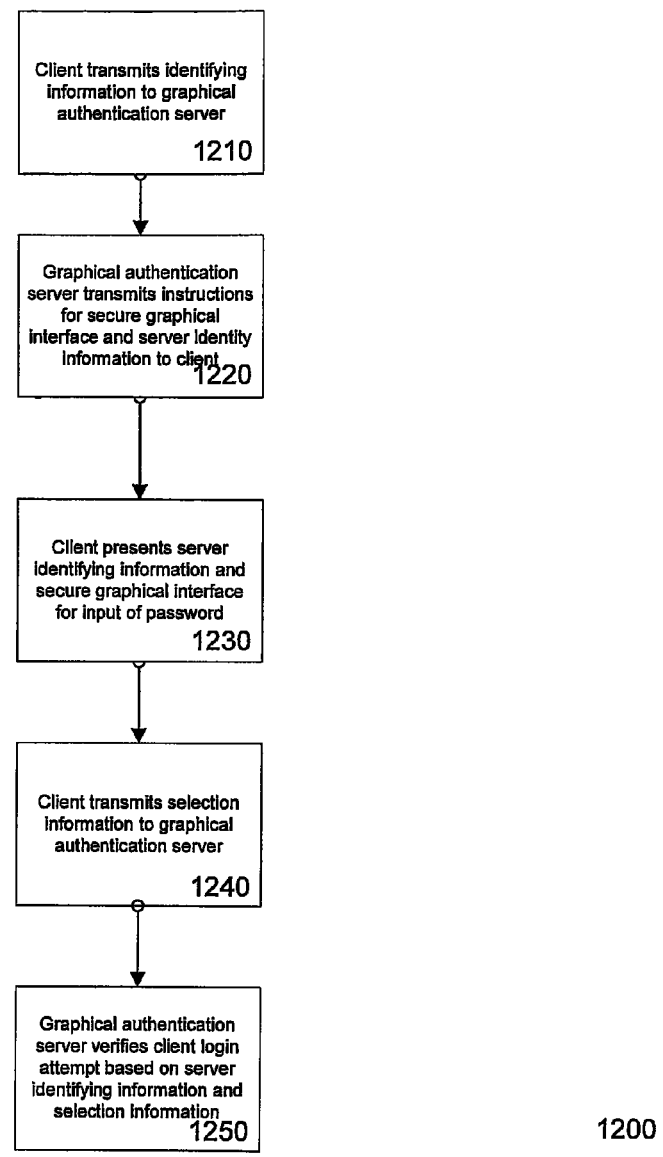
FIG. 12 is a flowchart illustrating an exemplary authentication process using a secure graphical interface and server authentication, according to one embodiment of the present invention.

FIG. 12 is a flowchart illustrating an exemplary authentication process using a secure graphical interface and server authentication, according to one embodiment of the present invention. For example, a third party server 130 transmits to a client 120 the time of the user's last successful log in. Because a server masquerading as the legitimate third party server 130 would not be able to provide a correct time of a user's last log in, the user can determine if this third party server 130 is the authentic server, or instead a malicious server attempting to trick the user into revealing log in information. According to one embodiment, the embodiment prevents the risk of disclosure of sensitive information to a malicious server posing as the authentic graphical authentication server 110.

Client 120 transmits information related to the identity of the client to the graphical authentication server 110 (1210). The graphical authentication server 110 sends the secure graphical interface 121 and information related to the identity of the graphical authentication server 110 for presentation by the client 120 (1220). The client 120 presents the server identification information and the secure graphical interface 121 to a user interacting with client 120 (1230). In one embodiment, the client log in information may change based on the server identification information. In yet another embodiment, a component of the client password may involve the selection of specific information from the server identification information. Using secure graphical interface 121, client 120 sends selection information to the graphical authentication server 110 (1240) The graphical authentication server 110 verifies the client login attempt based on the server identification information and the selection information related to the client name and password (1250).

Figure 13:
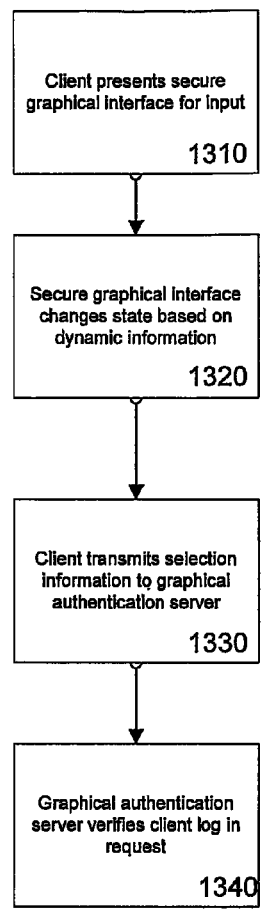
FIG. 13 is a flowchart illustrating an exemplary authentication process using a dynamic secure graphical interface, according to one embodiment of the present invention.

FIG. 13 is a flowchart illustrating an exemplary authentication process using a dynamic secure graphical interface, according to one embodiment of the present invention. For example, an automatic teller machine ("ATM") presents a secure graphical interface 121 of numerals 0 through 9 on a touchscreen. The ATM changes the positions of each numeral each 15 seconds.

Client 120 presents the secure graphical interface 121 to a user interacting with client 120 (1310). The presentation of the graphical representations in secure graphical interface 121 changes based on dynamic information (1320). In one embodiment, the secure graphical interface 121 changes the color assigned to each graphical representation presented by alternating the color presented through a list of a group of colors. For example, a graphical element alternates between red, blue, yellow, and green as time elapses. In another embodiment, the secure graphical interface 121 changes the position of each graphical representation based on dynamic information. In another embodiment, the secure graphical interface 121 displays different graphical representations based on dynamic information.

In a further embodiment, the secure graphical interface 121 presents different images and layouts of the secure graphical interface 121 based on dynamic information. For example, the secure graphical interface 121 may present an image or map in the background of the secure graphical interface 121. The image or map displays multiple graphical selectors, described in process 1400.

This dynamic information includes time-related data or user input data. For example, dynamic information may include how much time has elapsed since the generation of the secure graphical interface. User input data includes input data received by a client 120. For example, a secure graphical interface 121 may include an interface to receive user input to change the state of the secure graphical interface 121. In another embodiment, the secure graphical interface 121 receives input from a user selecting aspects of the presentation of the graphical representations of the secure graphical interface. For example, the dynamic information may be information corresponding to a user selection of a certain map or image to display in the secure graphical interface 121. In another example, the dynamic information may be information corresponding to a user selection of combinations of graphical representations.

In another embodiment, the current presentation of the secure graphical interface 121 may be a component of the client log in information. For example, the secure graphical interface 121 may change the color of the presentation of graphical representations based on time elapsed since the client request to log in, and a user password may require that the secure graphical interface 121 receive input from a user to select a password while the secure graphical interface 121 presents a particular graphical representation in a pre-selected color.

Using the secure graphical interface 121, client 120 transmits selection information to the graphical authentication server 110 based on coordinate-based input (1330). In a further embodiment, the selection information includes the dynamic information and information corresponding to the displayed graphical representations at the time when coordinate-based input is received.

The graphical authentication server 110 verifies the client log in request based on the selection information and dynamic information (1340). In another embodiment, the graphical authentication server verifies the client log in request based on the selection information and the displayed graphical representations at the time of input (1340). In another embodiment, the graphical authentication server 110 determines the corresponding state of the secure graphical interface 121 based on the dynamic information.

Figure 14:
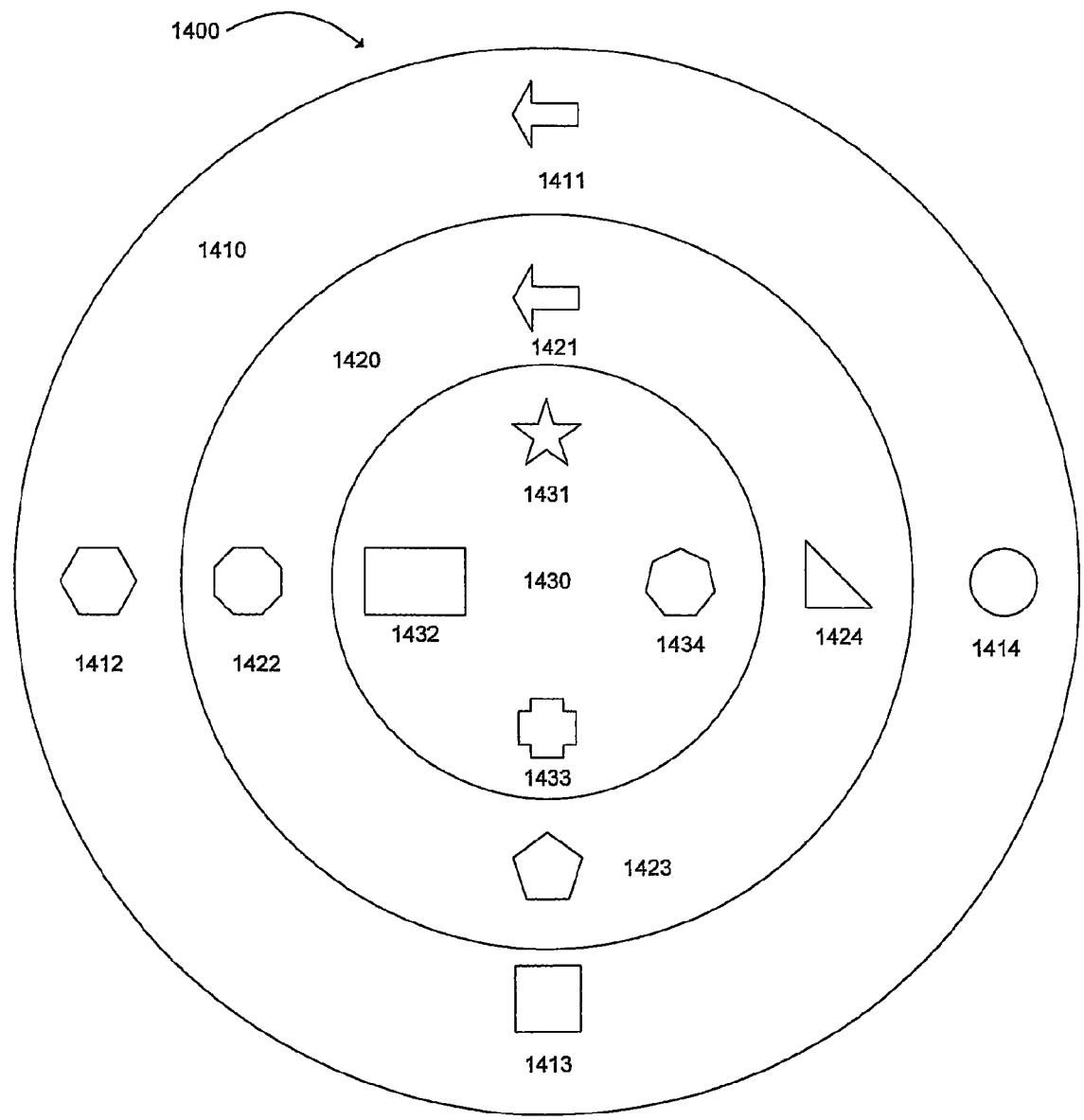
FIG. 14 illustrates a block diagram of an exemplary embodiment of a secure graphical interface using multiple graphical markers, according to one embodiment of the present invention.

FIG. 14 illustrates a block diagram of an exemplary embodiment of a secure graphical interface using multiple graphical markers, according to one embodiment of the present invention. To select a password, a user rotates each section 1410, 1420, and 1430 to match up the graphical icons in a straight line.

A selection is indicated by the secure graphical interface 1400 receiving information corresponding to the rotation of the different rotating selector areas 1410, 1420, and 1430 to align the graphical representations 1411-1414, 1421-1424, and 1431-34. The invention is not limited to circular representations of this embodiment.

For example, a correct password may be indicated by the rotation of each selector area 1410, 1420, and 1430 so that the circle graphical representation 1414 appears in a straight line with the triangle graphical representation 1424 and the star graphical representation 1431. In this example, there are numerous positions where these graphical representations 1411-1414, 1421-1424, 1431-1434 will appear in a straight line. For example, the selectors may be rotated such that the proper password is shown at the top, bottom, left, or right lines. Also, a malicious client attempting to determine the password will be unable to determine the selected password. In this case, there are four distinct potential passwords selected by this state of the secure graphical interface 1400.

In an embodiment, the graphical authentication server 110 generating the secure graphical interface 1400 randomly assigns the positions of the graphical representations 1411-1414, 1421-1424, 1431-1434 within each selector 1410, 1420, and 1430. In another embodiment, the graphical representations 1411-1414, 1421-1424, 1431-1434 are assigned colors that change based on time, as described in FIG. 13.

Figure 15:
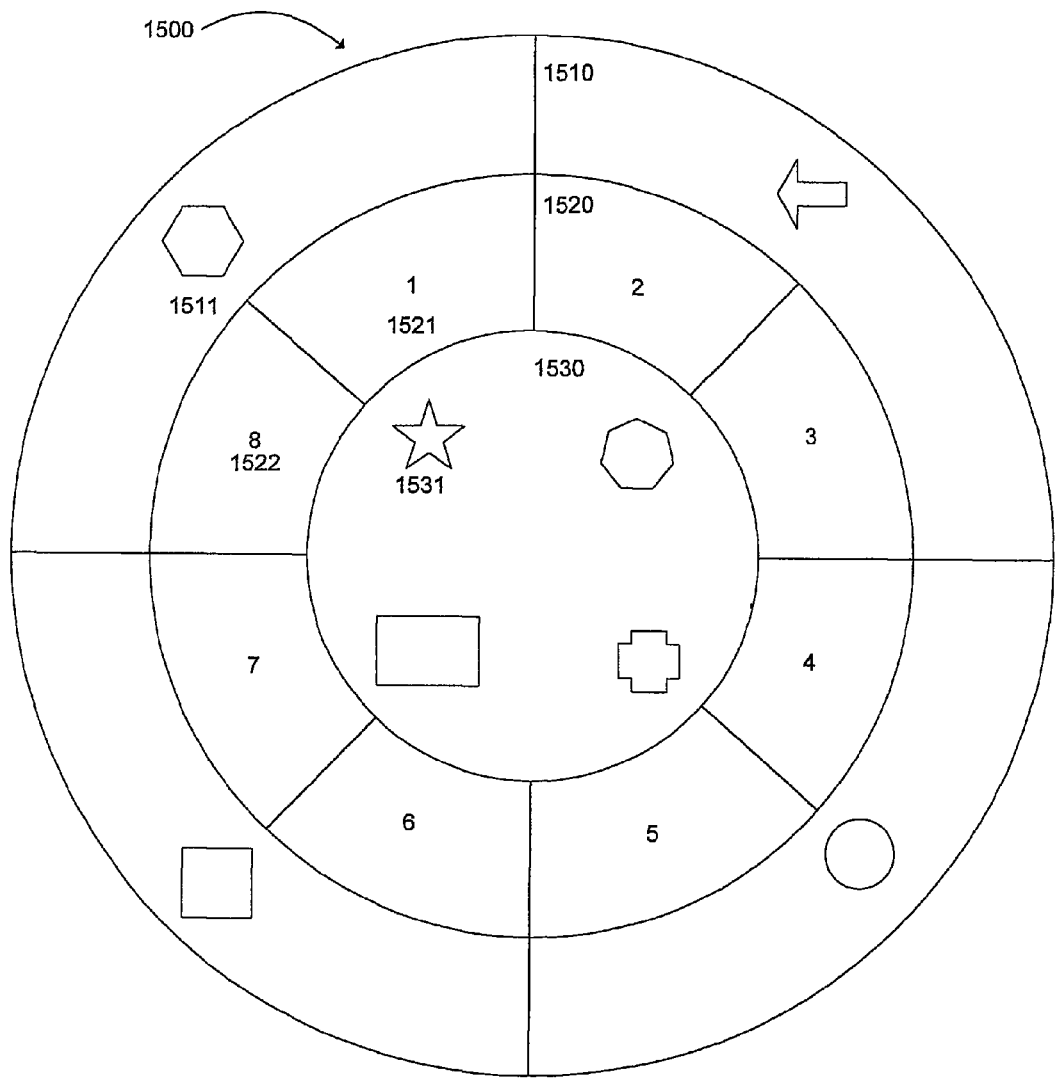
FIG. 15 illustrates a block diagram of an exemplary embodiment of a secure graphical interface using unequal graphical markers, according to one embodiment of the present invention.

The embodiment need not have equal numbers of graphical markers 1411-1414, 1421-1424, 1431-1434 at each selector 1410, 1420, 1430. FIG. 15 illustrates a block diagram of an exemplary embodiment of a secure graphical interface using unequal graphical markers, according to one embodiment of the present invention. The invention is not limited to circular representations of this embodiment. This embodiment increases the number of possible selected passwords with the same group of graphical markers 1511, 1521, and 1531. For example, there are eight graphical markers 1521 in the second tier selector 1520, but four graphical markers 1511 in the first tier selector 1510 and four graphical markers 1531 in the third tier 1531. In this example, the star shape graphical marker 1531 aligns with numeral one graphical representation 1521 and hexagon graphical representation 1511 to form a password. The star shape and hexagon shape graphical markers 1531 and 1511 also align with the numeral eight graphical representation 1522 to form another password.

Figure 16:
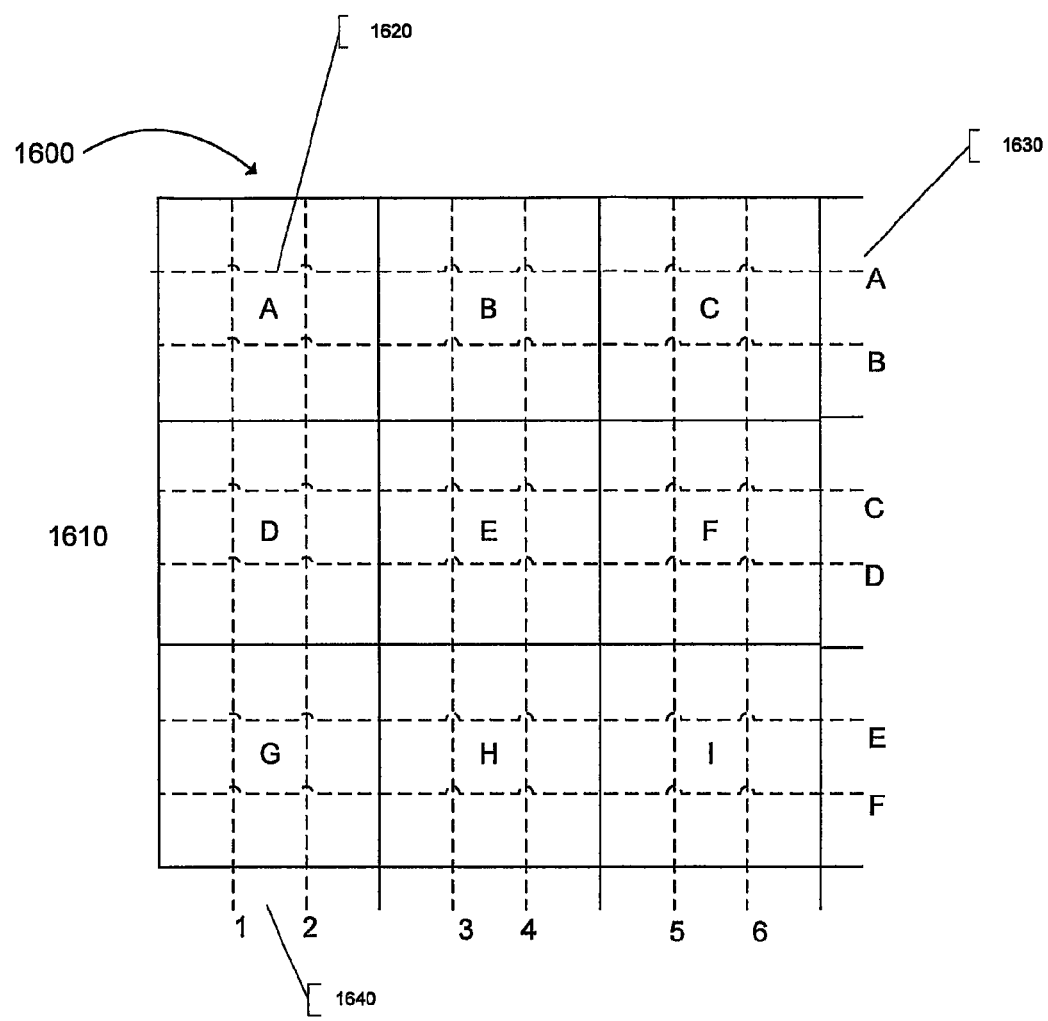
FIG. 16 illustrates a block diagram of an exemplary embodiment of a secure graphical interface that uses text-based coordinate input, according to one embodiment of the present invention.

FIG. 16 illustrates a block diagram of an exemplary embodiment of a secure graphical interface that uses text-based coordinate input, according to one embodiment of the present invention. For example, a secure graphical interface is presented on a client, designed for disabled persons, that does not have a mouse, touchpad, or other pointing interface for user input. A user selects a letter and a number designating the coordinate of the letter they wish to select. To select letter "A," 1620, a user may press the keys "B" and "2."

An embodiment of the secure graphical interface is a key grid 1610 marked with a plurality of vertical and horizontal reference designators 1630, 1640 identified by letters and numbers. A secure graphical interface 121 accepts keyboard input indicating the coordinates of the selected graphical representation.

For example, the graphical representation 'A' 1620 is selected by keyboard input of the combinations of characters A1, A2, B1 or B2. The 'G' is selected by keyboard input of the combination of characters E1, E2, F1 or F2. In this example, the password 'GA' may be indicated by up to four different keyboard input combinations for G and another four different keyboard input combinations for A.

Figure 17:
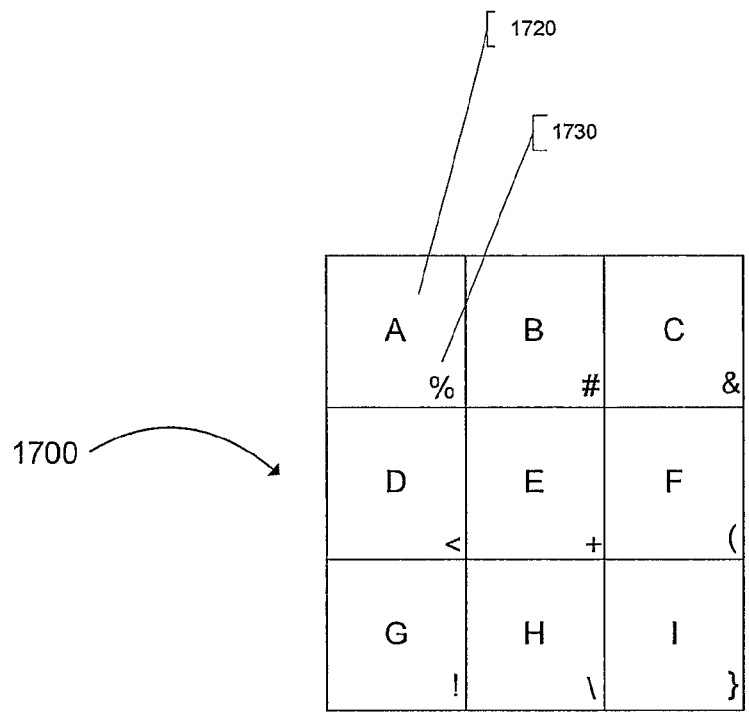
FIG. 17 illustrates a block diagram of an exemplary embodiment of a secure graphical interface mapping keyboard input to a graphical symbol, according to one embodiment of the present invention.

FIG. 17 illustrates a block diagram of an exemplary embodiment of a secure graphical interface mapping keyboard input to a graphical symbol, according to one embodiment of the present invention. For example, a secure graphical interface maps different characters on a keyboard to letters presented by the secure graphical interface. In this example, to select the letter "A," 1720, a user presses the "%" key on a keyboard.

In this embodiment of a secure graphical interface 1700, a graphical representation 1720 is associated with an input character 1730. In a further embodiment, a plurality of graphical representations 1720 are associated with an input character 1730. In a further embodiment of the current invention, the assignment of input characters to graphical representations is randomized. The invention is not limited to rectilinear representations of this embodiment.

This embodiment allows use of keyboard input while retaining the security and dynamic nature of the secure graphical interface 1700. For example, systems used by disabled persons unable to manipulate pointing devices, such as a computer mouse, may use this embodiment of the present invention. This embodiment allows for keyboard input while not exposing the selection information to vulnerability.

Figure 18:
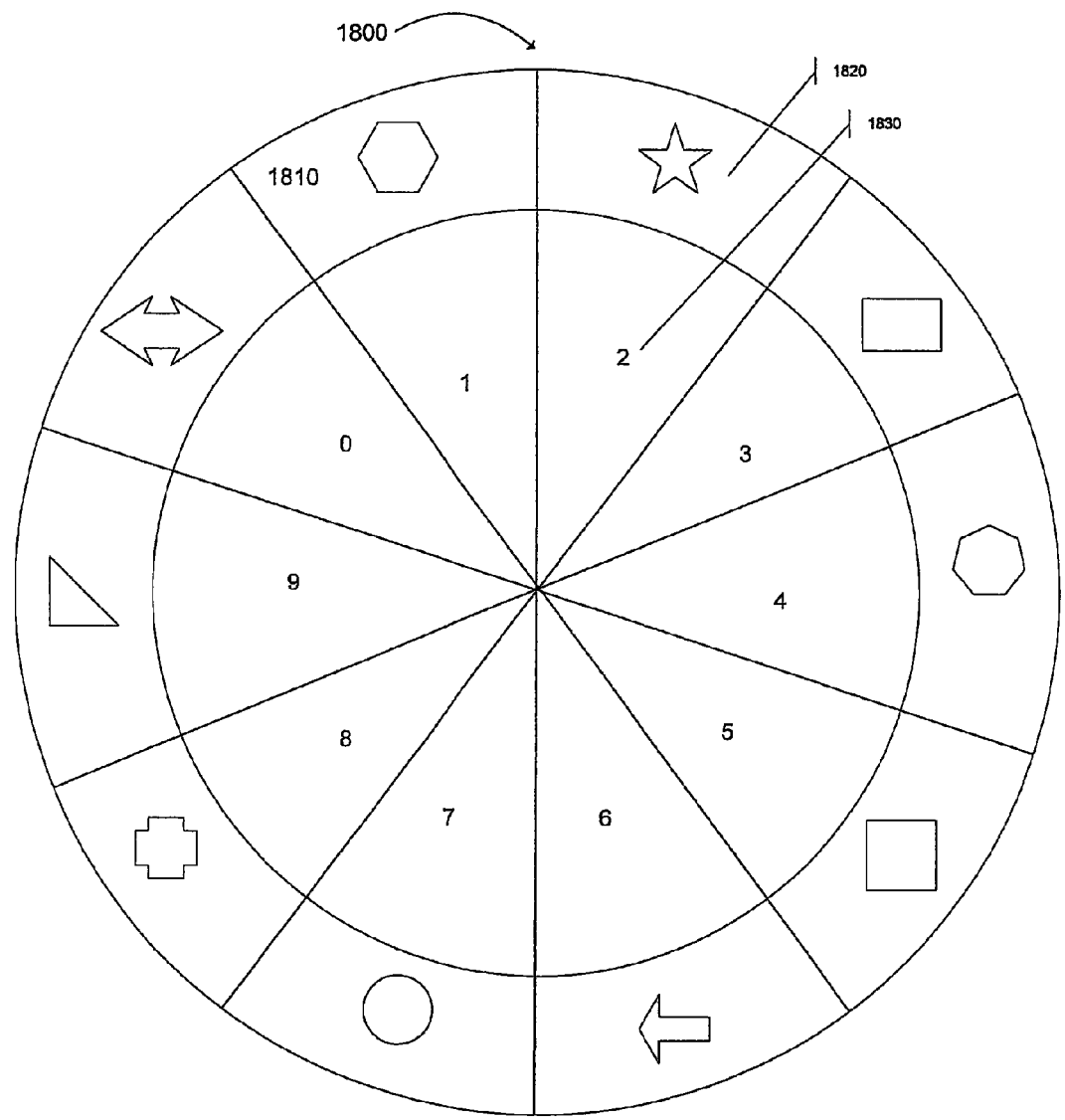
FIG. 18 illustrates a block diagram of an exemplary embodiment of a secure graphical interface mapping selection markers to alphanumeric characters, according to one embodiment of the present invention.

FIG. 18 illustrates a block diagram of an exemplary embodiment of a secure graphical interface mapping selection markers to alphanumeric characters, according to one embodiment of the present invention. For example, a secure graphical interface 121 matches a particular image to the selected number. In an embodiment, a client has an already-chosen graphical selection marker 1820. The client 120 presents a secure graphical interface 121 to a user interacting with a client 120 and receives information to manipulate a selector area 1810 to match the chosen graphical selection marker 1820 to the number selected 1830. In a further embodiment, the graphical authentication 110 server may indicate a graphical selection marker 1820 to indicate which graphical selection marker was selected by input to client 120. The invention is not limited to circular representations of this embodiment.

FIG. 19 illustrates an exemplary computer architecture for use with the present system, according to one embodiment of the invention. Computer architecture 1900 can be used to implement a client 120, a graphical authentication server 110, a third party server 130, or a database 140 of FIG. 1. One embodiment of architecture 1900 comprises a system bus 1920 for communicating information, and a processor 1910 coupled to bus 1920 for processing information. Architecture 1900 further comprises a random access memory (RAM) or other dynamic storage device 1925 (referred to herein as main memory), coupled to bus 1920 for storing information and instructions to be executed by processor 1910. Main memory 1925 also may be used for storing temporary variables or other intermediate information during execution of instructions by processor 1910. Architecture 1900 also may include a read only memory (ROM) and/or other static storage device 1926 coupled to bus 1920 for storing static information and instructions used by processor 1910.

A data storage device 1927 such as a magnetic disk or optical disc and its corresponding drive may also be coupled to computer system 1900 for storing information and instructions. Architecture 1900 can also be coupled to a second I/O bus 1950 via an I/O interface 1930. A plurality of I/O devices may be coupled to I/O bus 1950, including a display device 1943, an input device (e.g., an alphanumeric input device 1942 and/or a cursor control device 1941). For example, a secure graphical interface 121 presented by a client 120 may be presented to the user on the display device 1943.

The communication device 1940 allows for access to other computers (servers or clients) via a network. The communication device 1940 may comprise a modem, a network interface card, a wireless network interface or other well known interface device, such as those used for coupling to Ethernet, token ring, or other types of networks.

A coordinate-based computer authentication system and methods have been disclosed. Although the present methods and systems have been described with respect to specific examples and subsystems, it will be apparent to those of ordinary skill in the art that it is not limited to these specific examples or subsystems but extends to other embodiments as well.

What is claimed is:

1. A method of conducting an authentication session, said method comprising:
    presenting a login window during said authentication session, wherein the login window is a graphical interface, the graphical interface including a plurality of graphical images, one visual characteristic of each of at least two of said images dynamically changing during said authentication session;
    receiving authentication information corresponding to the time at which the occurrence of a preselected one of said dynamically changing images at a preselected position on said graphical interface relative to others of said plurality of graphical images, and having a preselected value of said visual characteristic, is indicated by a user during said authentication session; and
    authenticating the authentication information during said authentication session;
    wherein said indication of said preselected image with said preselected value of said visual characteristic being present at said preselected position is made using an input mechanism operably connected to said graphical interface; and
    wherein tracking information obtained by an external observer tracking the dynamically changing graphical images and tracking said indication provided by said user is insufficient to determine the identity of said preselected image, or of said preselected value, or of said preselected position.

2. The method of claim 1 wherein said changing of said visual characteristics occurs at a predetermined rate independent of said user.

3. The method of claim 1 wherein said changing of said visual characteristics occurs in response to an input by said user.

4. The method of claim 1 wherein said changing of said visual characteristics comprises a change in one of color, shape, and size.

5. A method of conducting an authentication session, said method comprising:
    presenting a login window during said authentication session, wherein the login window is a graphical interface, the graphical interface including a preselected background image comprising visible features that remain substantially unchanged during said authentication session and a plurality of graphical images superimposed on said background image, each of at least two of said plurality of graphical images having at least one feature that changes dynamically during said authentication session;
    receiving authentication information corresponding to the times at which the occurrence of a first composite image and a second composite image are sequentially indicated by a user during said authentication session, said first composite image comprising a preselected first one of said plurality of dynamically changing images superimposed on said background image at a first preselected position relative to a first visible feature of said background image, and said second composite image comprising a preselected second one of said plurality of dynamically changing images superimposed on said background image at a second preselected position relative to a second visible feature of said background image; and
    authenticating said authentication information during said authentication session;
    wherein said sequential indications are made using an input mechanism operably connected to said graphical interface; and
    wherein tracking information obtained by an external observer tracking the dynamically changing graphical images and tracking said indications provided by said user is insufficient to determine the identity of either one of said first and second preselected dynamically changing images, or of either one of said first and second preselected positions.

6. The method of claim 5 wherein the changing of said dynamically changing images occurs at a predetermined rate independent of said user.

7. The method of claim 5 wherein the changing of said dynamically changing images occurs in response to an input by said user.

8. The method of claim 5 wherein said first one of said plurality of said dynamically changing images is visibly different from said second one of said dynamically changing images.

9. The method of claim 5 wherein said first preselected position is different from said second preselected position.

* * * * *